June 15, 1948.  F. SCHROEDER  2,443,274
MEANS OF RENDERING ANIMAL FATS
Filed Aug. 3, 1945
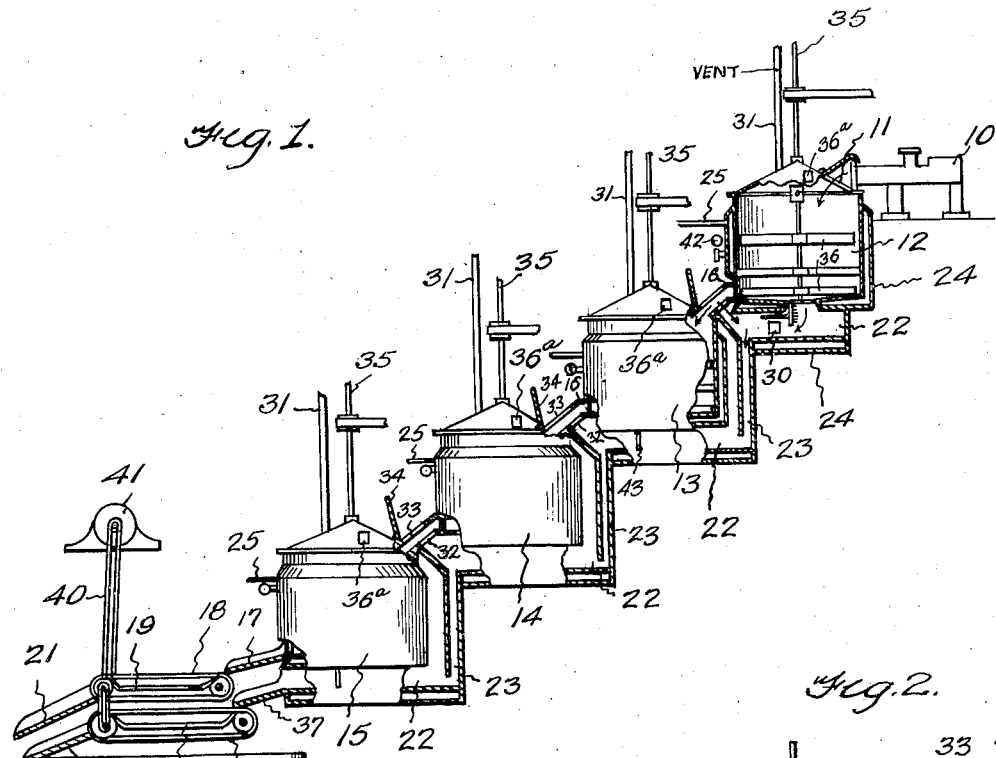
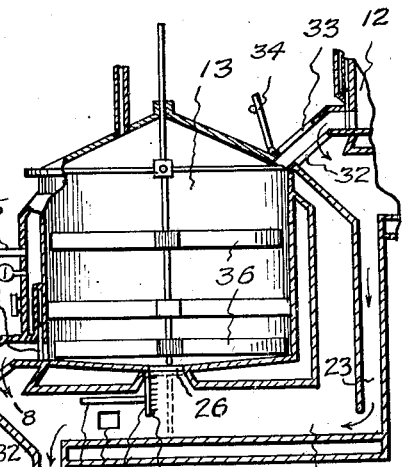
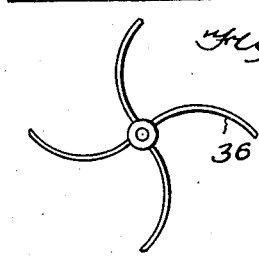
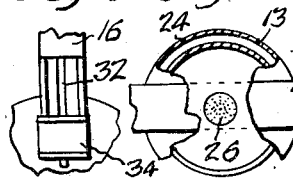
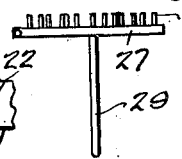
Inventor
FRED SCHROEDER
By
Attorney Patented June 15, 1948

2,443,274

UNITED STATES PATENT OFFICE 2,443,274

MEANS OF RENDERING ANIMAL FATS

Fred Schroeder, Mason City, Iowa

Application August 3, 1945, Serial No. 608,785

4 Claims. (Cl. 210—49.5)

This invention relates to a means and method of rendering animal fats and has for one of its objects the production of a simple and efficient means for passing the fats from one tank to another and draining off the rendered fats from the unrendered product.

A further object of this invention is the production of a simple and efficient method of draining off the fats from the unrendered product, so as to provide an efficient separation and a maximum production.

Other objects and advantages of the invention will appear throughout the following specification and claims.

In the drawing:

Figure 1 is a side elevational view of the apparatus or means for carrying out the present invention, certain parts of the apparatus being shown in section;

Figure 2 is an enlarged vertical sectional view of one of the tanks showing the communicating drains connecting with adjoining tanks;

Figure 3 is a plan view of one of the agitators;

Figure 4 is a plan view of one of the lugged plates for keeping the drain free and also providing a closure therefor;

Figure 5 is a side elevational view of the plate shown in Figure 4;

Figure 6 is a bottom plan view of one of the jacketed tanks certain parts being shown in section;

Figure 7 is a fragmentary top plan view of a part of one of the communicating spouts located between the tanks;

Figure 8 is a detail sectional view taken on line 8—8 of Figure 2.

By referring to the drawing, it will be seen that 10 designates a hasher which is located at a suitable elevation to deliver the hashed product through the entrance opening 11 of the first tank 12. Other tanks 13, 14 and 15, are employed in step-like formation, as shown in Figure 1. The tank 13 is located just below and in offset relation with respect to the tank 12 to receive drainage from the tank 12. The tank 14 is similarly located with respect to the tank 13, and the tank 15 is similarly located with respect to the tank 14, the successive tanks receiving drainage from the tank located just above. Each tank 12 to 14, inclusive, is provided with a discharge spout 16 for conveying the unrendered or partly rendered product to the next succeeding tank. The tank 15 is provided with a discharge spout 17 to deliver the unrendered product to a motor-driven cloth strainer belt 18 under which is placed a drain pan 19 for delivering the fat to the jacketed receiving tank 20. A suitable spout 21 delivers the residue from the belt 18 to a suitable point of disposal.

The tanks 12 to 15 inclusive are provided with jacketed drain pans 22 below the bottom of the tanks which communicates with the vertical drain channels 23 of the adjoining tanks to provide a continuous drain from the tank 12 through the tank 15, as shown in Figure 1. The tanks 12 to 15, as well as the drain pans 22, and drain channels 23 are provided with jackets 24 to receive steam to control the temperature of the tanks; and a suitable feed pipe 25 supplies steam thereto from a suitable source of supply. Each tank 12 to 15, inclusive, is provided with a suitable perforated drain opening 26 at the bottom thereof above the drain pan 22 to drain the fat into the pan 22. A closure plate 27 is hinged below each drain opening 26 and is provided with lugs or pins 28 for registering with and fitting in the apertures of the perforated drain opening 26 to close the drain opening if desired, and also to clean out the perforations of the drain opening. A handle 29 is carried by the closure plate 27 to facilitate the swinging of the closure plate 27 to and from a closed position. The handle 29 may rest upon the bottom of the pan 22 to support the plate 27 in its closed position after having been swung to the position shown in dotted lines in Figure 2. An opening 30, normally closed, is located in a position to permit access to the handle 29 for the purpose of swinging the plate 27 to and from a closed position. A suitable vent pipe 31 is provided for each tank. Each spout 16 is provided with a bottom drainage slot 32 for draining the fat passing therethrough to the drain pan 22 located below the slot. An opening 33 is provided in each spout 16 to permit access thereto in case of clogging and a cover 34 normally closes this opening 33.

A vertical adjustor shaft 35, suitably driven, is carried by each tank. A pair of agitators 36 are carried by each shaft 35 and rotate in the tanks 35 for agitating the product while rendering the fat. A suitable opening 36a, normally closed, is provided in the top of each tank to permit access to the interior thereof. A discharge spout 37 communicates with the drain pan 22 of the tank 15 to deliver the rendered fat to the motor-driven cloth strainer 38 of an endless type. A drain pan 39 delivers the drainage therefrom to the receiving tank 20. A spout 39' leads from the strainer 38 to deliver the residue to a suitable point of disposal. The endless strainers 18 and 38 are driven by a belt 40 from a motor 41.

A suitable door or gate 33ᵃ is located at the junction of the spout 16 with the adjacent tank and this door or gate 33ᵃ normally remains closed until the tank is partly filled. A suitable operating handle 34ᵃ operates the door or gate 33ᵃ to move the same to a selected open or closed position. This handle may be of any desired type.

From the foregoing description it will be noted that I employ a series of tanks arranged in offset relation, one tank being elevated relative to the next-adjoining tank so that the tanks will be mounted in a step-like formation. In actual practice these tanks are preferably round, jacketed tanks to withstand fifty pounds' steam pressure and may be approximately eight feet in diameter and six feet in depth. The size of the tanks may be varied without departing from the invention, depending upon the volume of fat to be rendered.

As explained above, each tank is provided with a perforated plate in the center of the bottom thereof to drain off rendered fat, leaving only the residue or partly rendered product in the tank. The lugged plate 27 which acts in conjunction with the perforated plate 26 carries lugs 28 which are aligned with the perforations in the plate 26 for cleaning out the perforations and also to keep the perforations closed when necessary as above described. The handle 29 of each plate will rest on the drain pan below each tank when the perforations are closed. The slotted spouts 16 forming connections between the tanks convey the product from one tank to another until the process is completed, the slots 32 draining off the rendered product into the channels 23 and conveying the unrendered or partially rendered product to the next-adjoining tank. The drained rendered product from the tank 12 will be drained into the steam jacketed drain pan 22 below the tank 12 and will be passed down through the channel 23 to the drain pan 22 below the tank 13. The drained rendered product from the tank 13 will drain into the pan 22 below the tank 13 and the drainage from the tanks 12 and 13 will be passed down through the channel 23 into the pan 22 below the tank 14. The tank 15 will be similarly drained and the final drainage will pass down through the spout 37 upon the strainer 39 and into the receiving tank 20, the surplus or cracklings produced passing down the spout 17 and across the strainer 18 as above described. As described also each tank is provided with mechanical agitators and permanently attached covers are provided for each tank through which the vent 31 extends. Clean-out doors 36ᵃ as described are provided to facilitate the cleaning of the tanks. The tanks and drain pans are provided with suitable steam gauges 42 and thermometers 43 in any suitable number or location to facilitate operation.

In carrying out the process, the raw fats are passed through the hasher 10, and then enter the tank 12. Before operation of rendering is begun, steam is turned on all of the tanks and drain pans to fifty pounds' pressure. As fats enter the tank 12 the perforations in the plate 26 are kept closed by swinging the lugged plate 27 to a closed position and the perforations are kept closed until the tank has approximately four feet level of fat in the tank. The lugged plate 27 is then opened and this process is followed through from tank to tank. It should be further understood that any number of tanks may be employed, but it is preferable to employ more than one tank. The rendered product finally drains into the receiving tank and the cracklings go to the expellers.

In large operations 20,000 to 30,000 pounds of raw fat per hour may be rendered by the use of the four tanks illustrated, whereas in smaller operations the product should be handled much faster and the size of the tank may be determined according to the best judgment of the operator to suit the volume of the product which is to be rendered.

From the foregoing description it will be seen that a very simple, economical and sanitary system is provided for rendering fat, and that the apparatus may be easily cleaned and produces a clear and efficient product.

Certain detail changes in the construction of the apparatus and in the system employed may be made without departing from the spirit of the invention, so long as such changes fall within the scope of the appended claims.

Having described the invention, what is claimed as new is:

1. An apparatus of the class described comprising a series of steam jacketed and heated tanks arranged one above the other, a hasher for delivering hashed fat to the first tank of the series, an agitator in each tank, means for actuating each agitator, a drain at the bottom of each tank for draining off the rendered fat by gravity, a steam jacketed and heated drain pan below each drain of each tank, communication conduits connecting the drain pans of the series of tanks, a receiving tank located adjacent the last tank of the series, a strainer interposed between the last tank and the receiving tank for straining the rendered fat as it passes from the last tank, and means for disposing of the residue of the hashed fats from the last tank.

2. An apparatus of the class described comprising a series of heated tanks arranged one above the other, the vertical center of one tank being laterally located relative to the adjoining tank, a hasher for delivering hashed raw fat to the first tank of the series, an agitator in each tank, means for rotating each agitator, a drain at the bottom of each tank for draining off the rendered fat, a heated drain pan below each drain of each tank, communication conduits connecting the drain pans of the series of tanks, a receiving tank located adjacent the last tank of the series, a strainer interposed between the last tank and the receiving tank for straining the rendered fat as it passes from the last tank, and means for disposing of the residue of the hashed fats from the last tank.

3. An apparatus of the class described comprising a series of steam jacketed heated tanks arranged one above the other, the tanks being progressively elevated and laterally displaced relative to the next lower tank, a hasher for delivering hashed raw fat to the first tank of the series, an agitator in each tank, means for rotating each agitator, a drain at the bottom of each tank for draining off the rendered fat by gravity, a steam jacketed heated drain pan below each drain of each tank, communication conduits connecting the drain pans of the series of tanks, a receiving tank located adjacent the last tank of the series, a strainer interposed between the last tank and the receiving tank for straining the rendered fat as it passes from the last tank, a strainer interposed between the last tank and the receiving tank for receiving the residue of cracklings as they pass from the last tank, and means for disposing of the residue of the hashed fats from the last tank.

4. A tank construction of the class described comprising a steam jacketed body having a perforated drain at its bottom, agitators rotatably mounted in the body, means for rotating each agitator, a drain pan located below said body, a lugged plate hinged adjacent said perforated drain and having lugs adapted to fit in the perforations of the perforated drain to clean the perforations and to also provide a closure for said perforated drain, a support carried by said plate adapted to rest upon the bottom of said drain to hold the plate in a closed position, said tank having a drain channel communicating with said drain pan, and a drain discharge spout located at the bottom of the tank and communicating with the interior of the tank for draining cracklings from said tank.

FRED SCHROEDER.

REFERENCES CITED

The following references are of record in the file of this patent:

UNITED STATES PATENTS

| Number | Name | Date |
|---|---|---|
| Re. 2,049 | Gray | Aug. 8, 1865 |
| 146,586 | Firman | Jan. 20, 1874 |
| 179,883 | Andrew | July 18, 1876 |
| 189,541 | Andrew | Apr. 10, 1877 |
| 550,342 | De La Croix | Nov. 26, 1895 |
| 567,210 | Wilson | Sept. 8, 1896 |
| 668,210 | Powter | Feb. 19, 1901 |
| 707,565 | Edson | Aug. 26, 1902 |
| 1,000,086 | Goetz et al. | Aug. 8, 1911 |
| 1,024,230 | Turner et al. | Apr. 23, 1912 |
| 1,785,361 | Powling | Dec. 16, 1930 |
| 2,199,670 | Lowry | May 7, 1940 |
| 2,341,817 | Santucci | Feb. 15, 1944 |

FOREIGN PATENTS

| Number | Country | Date |
|---|---|---|
| 4,137 | Great Britain | 1891 |
| 22,238 | Great Britain | 1904 |